Patented June 14, 1938

2,120,933

UNITED STATES PATENT OFFICE 2,120,933

DISPERSING AGENT

Harry R. Dittmar, Wilmington, Del., assignor to E. I. du Pont de Nemours & Company, Wilmington, Del., a corporation of Delaware No Drawing. Application April 18, 1935, Serial No. 17,131

9 Claims. (Cl. 260—2)

This invention relates to a process for the preparation of dispersing agents and more particularly to the preparation of dispersing agents by the interaction of acrylic acid esters and the alpha and beta substituted acrylic acid esters with aqueous ammonia.

An object of the present invention is to provide new and improved dispersing agents. Another object of the invention is to provide a process for the preparation of highly useful dispersion agents which are obtained by interacting the acrylic acid esters and alkacrylic acid esters with aqueous ammonia. A more specific object of the invention is to provide a new composition of matter resulting from the polymerization of the product obtained by reacting methyl methacrylate with aqueous ammonia. Other objects and advantages of the invention will hereinafter appear.

I have found that the products obtained by interacting esters of acrylic and alpha substituted acrylic acids with aqueous ammonia, in a manner which will hereinafter be more fully particularized, are exceptionally well adapted for use as dispersing agents. The general method by which I prefer to make this class of dispersing agents involves, for example, the reaction of aqueous ammonia with methyl methacrylate until a homogeneous solution is obtained, the reaction being allowed to proceed either at room temperatures and pressures, or, if higher temperatures are used, at elevated pressures. The resulting solution is concentrated by distillation, preferably at subatmospheric pressure, during which period water together with substantially all the free ammonia and methanol are driven off. The resulting product is then diluted with water and subsequently polymerized to give a gel-like product. Various methods may be employed for effecting the polymerization, such, for example, as subjecting the liquid to elevated temperatures in the presence or absence of polymerizing agents, such as hydrogen peroxide, benzoyl peroxide, succinic peroxide, and the like, or by subjecting it to the action of ultraviolet radiations.

The distillation of ammonia from the product is important for the reason that ammonia tends to act as an inhibitor to polymerization and consequently, if there is an appreciable amount present after the distillation step, complete polymerization of the monomeric product to give a satisfactory dispersing agent will be very difficult if not impossible. It has been found that the reaction product obtained when the solution becomes homogeneous consists essentially of methacrylamide, ammonium methacrylate, and methanol. Since this mixture of compounds is in an aqueous solution, the ammonium methacrylate hydrolyzes to give ammonia and methacrylic acid, and consequently, as distillation progresses, more and more hydrolysis results from the evaporation of the ammonia from the solution. Subsequent to distillation the product is believed to contain methacrylamide, methacrylic acid, and a small amount of ammonium methacrylate. If elevated temperatures and pressures are employed in the distillation substantially all of the ammonia fixed as ammonium methacrylate will be driven off leaving a high relative proportion of methacrylic acid, while if lower temperatures are used free ammonia and most of the original ammonium methacrylate will be found in the reaction product. The principal disadvantage, of operating under high temperatures, is that the polymerized product is difficultly soluble, while the product resulting from distillation at lower temperatures contains so much free ammonia that it is polymerized only with difficulty.

I have found that, if the distillation of the homogeneous mixture is conducted at pressures ranging between 75–300 mm. and temperatures ranging between 60–90° C. and preferably between 100 and 125 mm. pressure and the corresponding temperature, a product is obtained which upon polymerization gives a gel-like resin containing polymethacrylamide, polymethacrylic acid, and some polymeric ammonium methacrylate. The exact composition of the product present in this solution, due principally to the close chemical relationship between its constituents, is not known and is almost impossible of exact determination.

Altho I prefer to use the products resulting from distillation at low temperatures and reduced pressures, dispersing agents suitable for many purposes may be produced if the distillation of the homogeneous reaction mixture is conducted at normal pressures and elevated temperatures. When the distillation step is conducted in this manner, due, it is believed, to the presence of a high relative concentration of methacrylic acid as compared to the methacrylamide, a polymer is produced which is not easily soluble and not absolutely water white; for many purposes, therefore, it is not as suitable as the product prepared in accord with my preferred method. The gel-like product obtained in accord with this high temperature method of procedure may be used, however, as a dispersing agent in processes not requiring rapid solution or absolute clarity of final product.

After distillation in accord with my preferred method of procedure, i. e. at pressures ranging from 75–300 mm., a considerable portion of the water is evaporated with the ammonia and methanol. If the compounds present in such a concentration are polymerized, a resinous product results which is not as readily soluble as the products polymerized from a more dilute solution. I prefer, therefore, to add to the product, subsequent to distillation, an amount of water which will give, after polymerization, a gel-like resin having the desired solubility characteristics. Generally, the addition of the amount of water evaporated is sufficient to give such a product, altho a smaller or greater amount of water may be used, in order to adjust the solubility to the degree desired in the finished resin.

After evaporation the pH of the solution is in the neighborhood of 7 and, even tho there may be no substantial amount of free ammonia present, the solution is often difficult to polymerize. I have found, however, that by lowering the pH value to approximately 6 or lower by the addition of acetic acid the polymerization takes place readily by any of the well known methods, such as those described above. Any suitable organic or inorganic acid may be employed to lower the pH value and such acids as formic acid, propionic acid, and the higher aliphatic organic acids, together with such inorganic acids as sulfuric acid, phosphoric acid, hydrochloric acid, and the like, may be employed.

The gel-like resin is an exceptionally good dispersing agent. It is used particularly in effecting dispersions in water and is especially well adapted for the dispersion, prior to polymerization of the following water insoluble polymerizable compounds: the nitriles, and esters of acrylic acid, e. g. methyl, ethyl, propyl, butyl, and higher alkyl esters of acrylic acid; the nitriles, and esters of methacrylic acid, e. g., methyl, ethyl, propyl, butyl, and amyl methacrylates, etc.; the higher alkacrylates e. g., nonyl, decyl, lauryl methacrylate, etc.; the primary, secondary and tertiary straight and branch chained saturated and unsaturated alcohol esters of methacrylic acids and other alkacrylic acids; the amino alcohol acrylates and methacrylates, e. g., diethyl amino ethyl acrylate, diethyl amino ethyl methacrylate, dicyclohexyl amino ethyl methacrylate, etc.

I shall now illustrate by way of examples a process of preparing my preferred dispersing agents and a method of using them, but it will be understood that I shall not be restricted to the details therein given except as my invention may be limited by the claims appended hereto.

*Example A.*—A mixture containing one volume of methyl methacrylate and two volumes of 28–29% aqueous ammonia was allowed to stand with periodic shaking for two to three days at room temperature. The resulting homogeneous liquid was concentrated to approximately ½ its volume by distillation at a pressure of 100–125 millimeters. The distillate was replaced by an equal volume of distilled water and the pH of the resulting solution lowered to approximately 5.0 by the addition of acetic acid. The resulting solution was placed for from 3–5 days in an oven maintained at approximately 60° C. A thick, gel-like resin resulted.

*Example B.*—A glass-lined jacketed kettle of 50 gallons capacity provided with a stirrer and a reflux condenser was charged with 25 gallons of water and 5 gallons of methyl methacrylate containing 1% (based on weight of monomer) of benzoyl peroxide, 0.8 to 1% (based on monomer) of the gel-like resin obtained under Example A, 18 grams of $Na_2HPO_4.12H_2O$ per gallon of water, and 0.94 gram of $NaH_2PO_4.H_2O$ per gallon of water. A T-shaped stirrer was revolved at 550 R. P. M., giving a fairly deep vortex and the temperature raised and maintained at approximately 80° C. Excellent dispersion of the monomeric methyl methacrylate was obtained and after approximately 1 hour the methyl methacrylate was polymerized completely to a granular polymer which separated as small globules or granules.

As I have indicated, the gel-like product obtained by reacting methyl methacrylate and ammonia is particularly well suited for dispersing acrylic and alpha substituted acrylic acid compounds during their polymerization. The gel-like dispersing agents of the invention may also be used for dispersing other polymerizable compounds prior to their polymerization, e. g., the vinyl esters, styrene, chloroprene, etc., and for dispersing dyes and pigments prior to printing, etc.

While I generally prefer to employ as a dispersing agent the product obtained from interacting methyl methacrylate with ammonia and subsequently polymerizing, dispersing agents may likewise be made in accord with my invention by forming in an analogous manner a polymeric gel-like product from the interaction of ammonia or substituted ammonia with other alkyl acrylates or alkyl methacrylates, e. g., methyl acrylate, ethyl acrylate, and the higher alkyl methacrylates, as, for example, butyl, propyl, and cyclohexyl methacrylates, and the like.

Furthermore, in lieu of allowing the reaction between the ester and the aqueous ammonia to proceed slowly at room temperature over a period of two or three days, this phase of the reaction may be shortened considerably by effecting it at elevated temperatures and under suitable pressures to prevent loss of the ammonia. When so conducted, this phase of the reaction may require but a few hours.

From a consideration of the above specification it will be realized that many improvements and modifications may be made in the process and products therein disclosed without departing from the invention or the scope thereof.

I claim:

1. A process for the preparation of a composition adapted for use as a dispersing agent which comprises reacting a monomeric ester of an acid selected from the group consisting of acrylic acid and methacrylic acid with aqueous ammonia until a homogeneous solution is obtained, distilling ammonia and water from the reaction product, and subsequently polymerizing an aqueous solution of the product.

2. A process for the preparation of a composition adapted for use as a dispersing agent which comprises reacting monomeric methyl methacrylate with aqueous ammonia until a homogeneous solution is obtained, distilling water, ammonia, and methanol from the reaction mixture, and subsequently polymerizing an aqueous solution of the reaction product.

3. A process for the preparation of a composition adapted for use as a dispersing agent which comprises reacting monomeric methyl methacrylate with aqueous ammonia until a homogeneous solution is obtained, distilling water, ammonia, and methanol from the reaction mixture at subatmospheric pressure, and subsequently polymerizing an aqueous solution of the reaction product.

4. A process for the preparation of a composition adapted for use as a dispersing agent which comprises reacting a monomeric ester of an acid selected from the group consisting of acrylic acid and methacrylic acid with aqueous ammonia distilling water and ammonia from the reaction mixture at sub-atmospheric pressure, adding an acid to the resulting product to give a pH of not more than 6 and subsequently polymerizing the product.

5. A process for the preparation of a composition adapted for use as a dispersing agent which comprises reacting monomeric methyl methacrylate with aqueous ammonia distilling water, ammonia, and methanol from the reaction mixture at sub-atmospheric pressure, lowering the pH value of the resulting solution to approximately 6 or less, and subsequently polymerizing the aqueous solution of the reaction product.

6. A process for the preparation of a composition adapted for use as a dispersing agent which comprises reacting monomeric methyl methacrylate with aqueous ammonia, distilling water, ammonia, and methanol from the reaction mixture at a pressure of from 75-300 mm., adding water and an acid to the resulting mixture to give a pH of approximately 6 or less, and subsequently polymerizing the solution.

7. A process for the preparation of a dispersing agent which comprises reacting monomeric methyl methacrylate with aqueous ammonia, distilling water, ammonia, and methanol from the reaction mixture at a pressure of from 100-125 mm., adding water and an acid to the resulting mixture to give a pH of approximately 5 or less, and subsequently polymerizing the solution.

8. A process for the preparation of a composition adaptable as a dispersing agent which comprises reacting a monomeric ester of an acid selected from the group consisting of acrylic acid and methacrylic acid with aqueous ammonia distilling water and ammonia from the reaction mixture at sub-atmospheric pressure, adding acetic acid to the resulting product to give a pH of not more than 6 and subsequently polymerizing the product.

9. A process for the preparation of a composition adaptable as a dispersing agent which comprises reacting 1 volume of monomeric methyl methacrylate with 2 volumes of 28 to 29% aqueous ammonia, distilling water, ammonia and methanol from the reaction mixture at a pressure of from 75 to 300 mm., replacing the distillate by an equal volume of distilled water and adding sufficient acetic acid to the resulting mixture to give a pH of approximately 6 or less, and subsequently polymerizing the resulting products by heating to a temperature of approximately 60° C.

HARRY R. DITTMAR.